(12) United States Patent
Rogers Hicks et al.

(10) Patent No.: US 10,751,649 B2
(45) Date of Patent: Aug. 25, 2020

(54) PROCESS FOR THE CONTINUAL INLINE FILTRATION OF A PROCESS STREAM

(71) Applicants: Covestro LLC, Pittsburgh, PA (US); Covestro Polymers (China) Co. Ltd., Shanghai (CN)

(72) Inventors: Amber Rogers Hicks, Manvel, TX (US); William A. Hassell, Seabrook, TX (US); Kevin M. Kelleher, Houston, TX (US); Kent Swart, Dayton, TX (US); Wingwah Lau, Houston, TX (US); Bin Tang, Shanghai (CN); Norbert Steindel, Leverkusen (DE)

(73) Assignees: Covestro LLC, Pittsburgh, PA (US); Covestro Polymers (China) Co., Ltd., Shanghai (CN)

( * ) Notice: Subject to any disclaimer, the term of this patent is extended or adjusted under 35 U.S.C. 154(b) by 0 days.

(21) Appl. No.: 15/099,801

(22) Filed: Apr. 15, 2016

(65) Prior Publication Data

US 2017/0021289 A1 Jan. 26, 2017

Related U.S. Application Data

(60) Provisional application No. 62/150,000, filed on Apr. 20, 2015.

(51) Int. Cl.
*B01D 29/64* (2006.01)
*B01D 35/02* (2006.01)
(Continued)

(52) U.S. Cl.
CPC ......... *B01D 29/6438* (2013.01); *B01D 29/33* (2013.01); *B01D 29/52* (2013.01);
(Continued)

(58) Field of Classification Search
None
See application file for complete search history.

(56) References Cited

U.S. PATENT DOCUMENTS

| 4,680,038 A | 7/1987 | Titus |
| 8,679,335 B1 | 3/2014 | Dufort |
| 2017/0021289 A1* | 1/2017 | Rogers Hicks .... B01D 29/6438 |

FOREIGN PATENT DOCUMENTS

| CN | 200984478 Y | 12/2007 |
| CN | 202010462 U | 10/2011 |

(Continued)

*Primary Examiner* — Robert J Popovics
(74) *Attorney, Agent, or Firm* — Richard P. Bender; John E. Mrozinski, Jr.

(57) ABSTRACT

The present invention provides a new type of filtration system. Traditional designs required that personnel open the system to clean/change strainers while a process was in operation. This invention provides a straining system that allows process stream to be filtered in a manner completely internal to the process. The system includes dual strainers with a nitrogen purging system and solvent flush system. A creatively designed "catch" area is installed internal to the process to collect all solids that are flushed from the strainer system. The system remains completely closed for the duration of each production campaign, thus eliminating the safety hazard and labor requirement associated with opening a process system.

7 Claims, 3 Drawing Sheets

(51) Int. Cl.
*B01D 29/52* (2006.01)
*B01D 29/68* (2006.01)
*B01D 29/33* (2006.01)
*B01D 29/66* (2006.01)
*B01D 39/10* (2006.01)

(52) U.S. Cl.
CPC ............. *B01D 29/66* (2013.01); *B01D 29/68* (2013.01); *B01D 35/02* (2013.01); *B01D 39/10* (2013.01)

(56) References Cited

FOREIGN PATENT DOCUMENTS

| | | |
|---|---|---|
| DE | 4242199 A1 | 6/1994 |
| GB | 914393 A | 1/1963 |
| JP | 5288868 A | 7/1977 |
| JP | 54174073 U | 12/1979 |

* cited by examiner

PROCESS FOR THE CONTINUAL INLINE FILTRATION OF A PROCESS STREAM

FIELD OF THE INVENTION

The present invention relates in general to chemical processes and more specifically to an inline filtration system for the continuous filtering of a process stream.

BACKGROUND OF THE INVENTION

Traditional dephosgenation strainer designs typically require the system be opened multiple times per shift for cleaning. This may put personnel, the facility and the environment at risk. Cleaning of strainers also may require a stoppage in ongoing maintenance and project work nearby, and necessitate production personnel be pulled away from ongoing process activities during each equipment opening.

To reduce or eliminate problems, therefore, a need exists in the art for an improved strainer system to be able to operate continuously without the need for frequent and potentially dangerous openings of the system.

SUMMARY OF THE INVENTION

It is understood that the invention disclosed and described in this specification is not limited to the embodiments summarized in this Summary.

The present invention provides a new type of filtration system. Traditional designs required that personnel open the system to clean/change strainers while a process was in operation. This invention provides a straining system that allows process stream to be filtered in a manner completely internal to the process. The system includes dual strainers with a nitrogen purging system and solvent flush system. A creatively designed "catch" area is installed internal to the process to collect all solids that are flushed from the strainer system. The system remains completely closed for the duration of each production campaign, thus eliminating the safety hazard and labor requirement associated with opening a process system.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
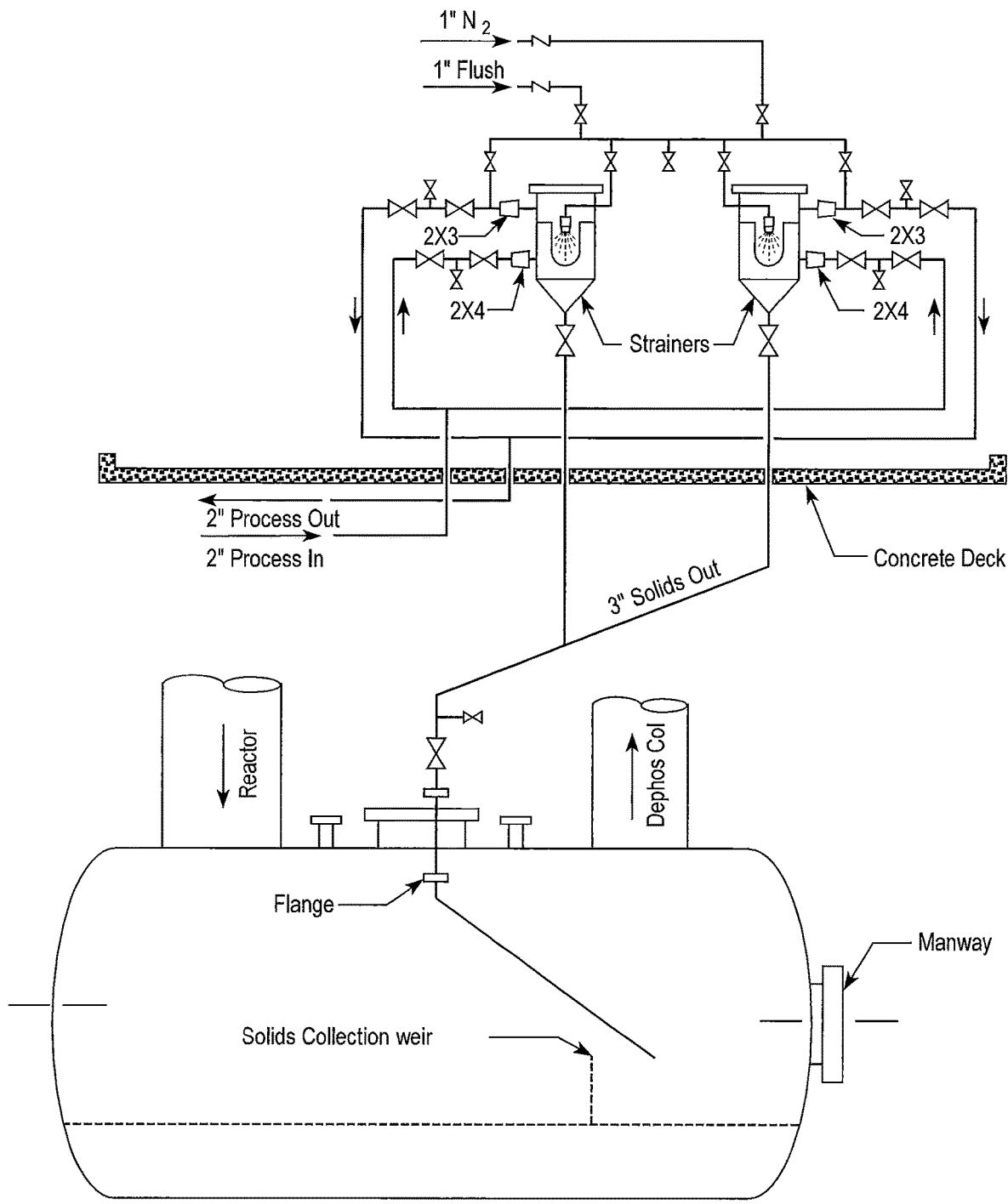
FIG. 1 shows the dual strainer system design of the present invention.

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicants reserve the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a).

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

Although described herein in the context of a continuous dephosgenation process, those skilled in the art will recognize the inventive strainer system will find applicability in a wide variety of processes where there is a desire to minimize operator, facility and environmental exposure to chemicals while continuing operations. The invention is not to be limited to the described embodiment.

In certain embodiments, the present invention is directed to new dephosgenation feed strainer to provide a more inherently safe system that reduces the potential for environmental emissions and personnel exposures. Traditional dephosgenation strainer designs include a dual filter pot system that requires the system to be opened multiple times per shift for cleaning. This may put personnel, the facility and the environment at risk. Cleaning of strainers also may require a stoppage in ongoing maintenance and project work nearby, and necessitate production personnel be pulled away from ongoing process activities during each equipment opening. As those skilled in the art will appreciate, installation of this more modern and environmentally friendly strainer system allows for improved safety through reduced process openings, and reduced opportunity for personnel and the environment to be exposed to chemicals. Not only does the inventive strainer system improve the safety of environment and personnel, it has accompanying incalculable benefits. The new installation promotes an improvement in morale for personnel, as well as a reduction in workload. Product quality within this system remains the same, but the opportunities for process upsets (inherent with traditional systems) have been eliminated.

In certain embodiments, the present invention provides the design for a new type of continuous filtration system. Traditional designs required that personnel open the system to clean/change the strainers while the process was in operation. The present invention provides a straining system that allows a process stream to be filtered completely internal to the process. In some embodiments, the inventive system includes dual strainers with a nitrogen purging system and solvent flush system. In one embodiment, a creatively designed "catch" area is installed internal to the process to collect all solids that are flushed from the strainer system. The system remains completely closed for the duration of each production campaign, thus eliminating the safety hazard and labor requirement associated with opening a process system.

In certain embodiments, there are three critical parts of the inventive system:
A) a dual strainer system;
B) a strainer pot and basket with spray nozzle; and
C) a catch area (installed internal to the process).
which will be described below.

A) Dual Strainer System Design

In some embodiments, the dual strainer system may comprise two strainers operating in parallel as shown in FIG. 1. While one strainer is on-line, the other remains available as an installed spare. A nitrogen purge and monochlorobenzene (MCB) flush may be connected to the system. The strainer system may proactively be flushed with monochlorobenzene (MCB) every 12 hours to remove any material from the strainer basket. The monochlorobenzene (MCB) spray may also be used to proactively prevent plugging of the strainer or drain piping.

The process remains unopened during normal process operations, which eliminates the possibility for personnel and environmental exposure to chemicals.

B) Strainer Design

Figure 2:
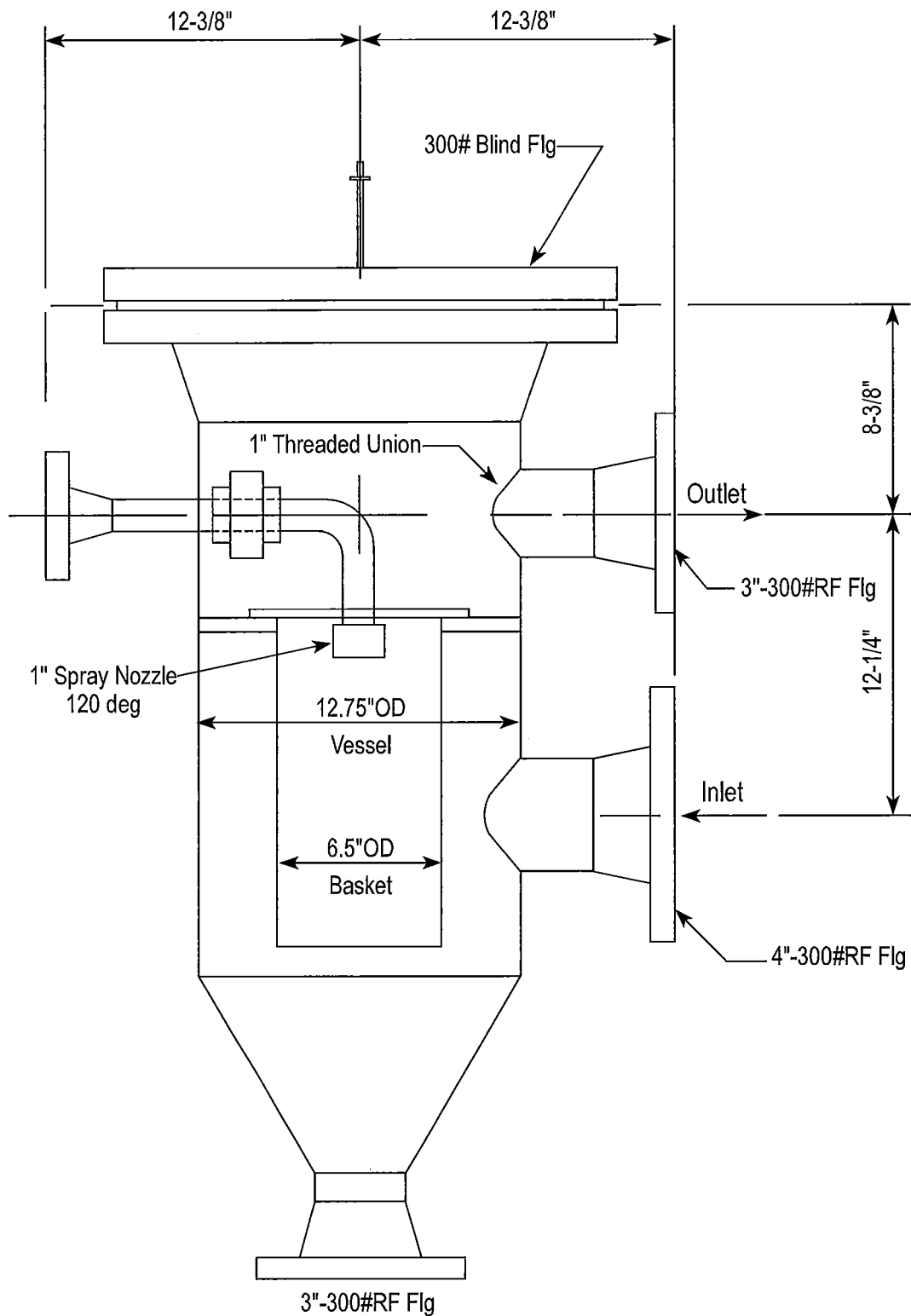
FIG. 2 illustrates one embodiment of the strainer design of the present invention.

In certain embodiments of the invention, the strainer includes a basket internally, as well as a monochlorobenzene (MCB) spray as illustrated in FIG. 2. The process flows into the strainer from the lower section of the basket and returns back to the process from the top section of the strainer. The strained material is collected on the outside of the strainer basket. In some embodiments, the monochlorobenzene (MCB) spray, installed at the top of the strainer, is sprayed from the top section, through the strainer basket, to keep the strainer basket free of material. The strained material is flushed from the strainer into the reactor collection tank vessel below, and collected in the specially designed "catch" area. This area holds the material during normal operation, and is emptied and cleaned during planned unit turnarounds.

C) "Catch" Area Design

Figure 3:
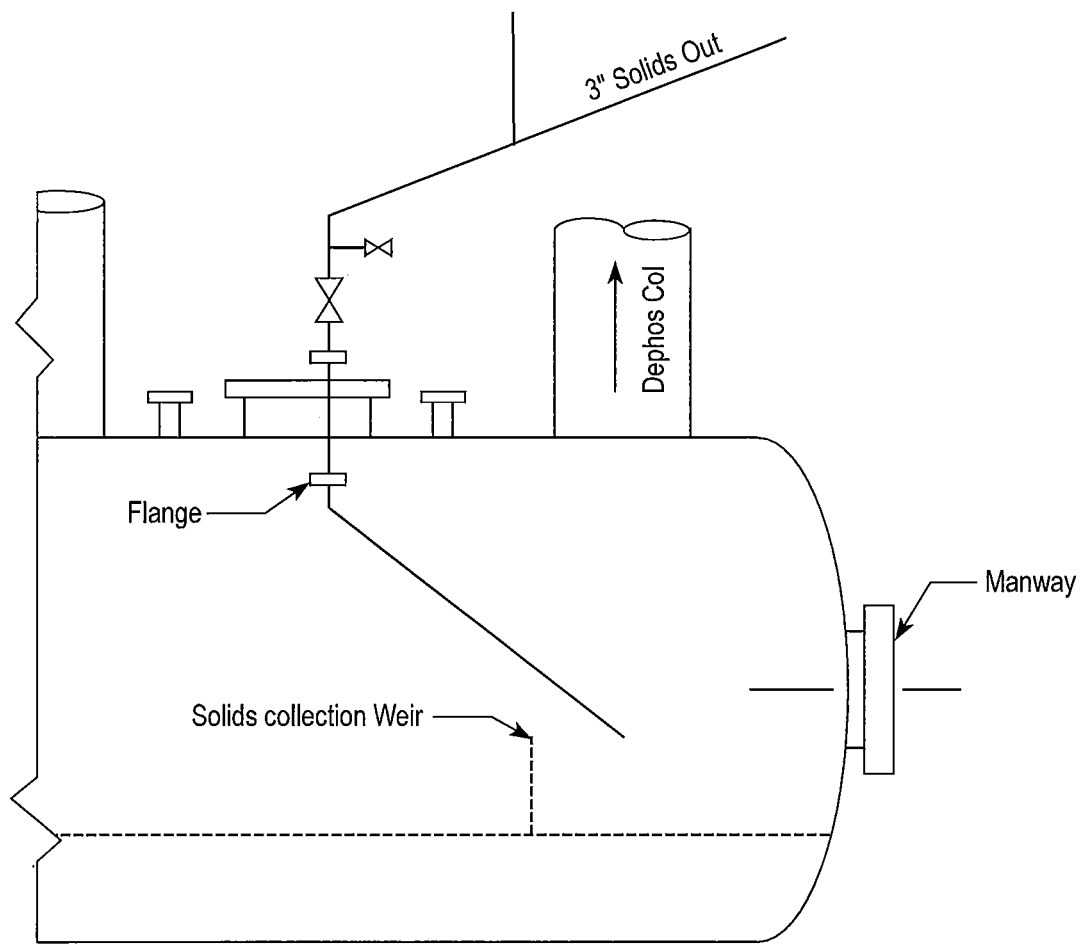
FIG. 3 shows one embodiment of a "catch" area of the present invention.

In certain embodiments, the "catch" area may be set up as an isolated area in a process vessel as shown in FIG. 3. In some embodiments, the area may be isolated by metal with small holes. Metal plates may be used to segregate the strained material in the collection tank. The piping from the bottom of the strainer system runs directly into this area when the strainers are flushed. Acting as strainer, the smaller holes of the metal isolation plates keep the solids in that area, while allowing the monochlorobenzene (MCB) solvent to drain to the sump of the vessel. This basket may be easily emptied and cleaned during planned unit turnarounds.

In certain embodiments, the internal collection equipment may be designed to handle a specific volume of solids. This amount of solids may be determined from process sampling and review of past data. The design may be calculated based on the overall residence time requirement.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U. S. C. § 112(a), and 35 U. S. C. § 132(a).

Various aspects of the subject matter described herein are set out in the following numbered clauses:

1. A continuous process filtration system comprising: A) a dual strainer system; B) a strainer pot and basket with spray nozzle; and C) a catch area, wherein the catch area is installed internal to the system.

2. The continuous process filtration system according to clause 1, wherein the process is dephosgenation.

3. A continuous process filtration system comprising the components illustrated in FIGS. 1, 2 and 3.

4 The continuous process filtration system according to clause 3, wherein the process is dephosgenation.

5. A continuous process filtration system comprising: a dual strainer system comprising two strainers operating in parallel, each strainer comprising a strainer pot and a basket with a spray nozzle and each strainer connected to a reactor collection tank vessel.

6. The continuous process filtration system according to clause 5, wherein each strainer further includes at least one purge line, at least one flush line and at least one drain.

7. The continuous process filtration system according to one of clauses 5 or 6, wherein the process comprises dephosgenation.

8. The continuous process filtration system according to clause 7, wherein the purge comprises nitrogen.

9. The continuous process filtration system according to one of clauses 7 or 8, wherein the flush comprises monochlorobenzene.

10. The continuous process filtration system according to one of clauses 7 to 9, wherein the spray comprises monochlorobenzene.

11. The continuous process filtration system according to one of clauses 5 to 10, wherein the catch area comprises a metal plate having one or more openings sized and shaped to permit liquid to pass therethrough.

12. A continuous filtration process involving a dual strainer system comprising two strainers, each strainer comprising a strainer pot having an outlet, an inlet and a basket with a spray nozzle, wherein the outlet is located in the upper portion of the strainer pot above the inlet located in the lower portion of the strainer pot, and each strainer is connected at its bottom portion to a reactor collection tank vessel including a catch area, the process comprising: feeding a process stream into the inlet of the strainer pot; removing a strained process stream from the outlet of the strainer pot.

13. The continuous filtration process according to clause 12 further including: flushing the strainer pot with a flush solution; draining the flush solution from the lower portion of the strainer pot into the reaction collection tank vessel; passing the flush solution onto the catch area; and collecting process stream residue from the catch area.

14. The continuous filtration process according to clause 12 further including: spraying the basket with a flush solution from the spray nozzle positioned above the basket in the upper portion of the strainer pot; draining the flush solution from the lower portion of the strainer pot into the reaction collection tank vessel; passing the flush solution onto the catch area; and collecting process stream residue from the catch area.

15. The continuous filtration process according to one of clauses 12 to 14, wherein the catch area comprises a metal plate having one or more openings sized and shaped to permit liquid to pass therethrough.

16. The continuous filtration process according to one of clauses 12 to 15, wherein the process comprises dephosgenation.

17. The continuous filtration process according to one of clauses 12 to 16, wherein the flush solution comprises monochlorobenzene.

What is claimed is:

1. A continuous inline filtration process having a first strainer pot and a second strainer pot, each of the first and second strainer pots having an outlet, an inlet, a strainer basket and a spray nozzle, and each strainer basket having an outside surface and an inside surface, comprising:
   i) feeding a process stream containing solids and liquids into the inlet of the first strainer pot;
   ii) straining the process stream through the strainer basket of the first strainer pot to create a first strained process stream;
   iii) collecting solids from the process stream on the outside surface of the strainer basket of the first strainer pot;
   iv) removing the first strained process stream from the outlet of the first strainer pot;
   v) diverting the process stream from the inlet of the first strainer pot to the inlet of second strainer pot;
   vi) straining the diverted process stream through the strainer basket of the second strainer pot to create a second strained process stream;
   vii) collecting solids from the diverted process stream on the outside surface of the strainer basket of the second strainer pot;
   viii) removing the second strained process stream from the outlet of the second strainer pot;
   ix) after step v), spraying a flush solution from the spray nozzle of the first strainer pot; and
   x) flushing solids from the outside surface of the first strainer pot to a collection tank vessel located below the first strainer pot,
   wherein each step is accomplished in equipment that is closed during operation.

2. The process of claim 1, wherein process steps vii) and x) are done simultaneously.

3. The process of claim 1, wherein the flush solution comprises monochlorobenzene.

4. The process of claim 1, wherein the collection tank vessel comprises a metal plate having one or more openings sized and shaped to permit liquid to pass therethrough.

5. The process of claim 1, further comprising:
   xi) diverting the process stream from the inlet of the second strainer pot to the inlet of the first strainer pot;
   xii) after step xi), spraying a flush solution from the spray nozzle of the second strainer pot; and
   xiii) flushing solids from the outside surface of the second strainer pot to a collection tank vessel located below the first strainer pot.

6. The process of claim 1, wherein the process further comprises a nitrogen purge.

7. The process of claim 1, wherein the process further comprises dephosgenation.

* * * * *